United States Patent [19]
Yarnall, Sr. et al.

[11] Patent Number: 5,170,149
[45] Date of Patent: Dec. 8, 1992

[54] CONFINEMENT ARRANGEMENT FOR ANIMALS

[76] Inventors: Robert G. Yarnall, Sr.; Robert G. Yarnall, Jr., both of Ford Road, Kimberton, Pa. 19442

[21] Appl. No.: 769,451

[22] Filed: Oct. 1, 1991

[51] Int. Cl.⁵ .................... G08B 21/00; A01K 15/00
[52] U.S. Cl. .................................... 340/573; 119/29
[58] Field of Search .................. 340/573; 119/29, 96, 119/106, 15

[56] References Cited

U.S. PATENT DOCUMENTS

| | | | |
|---|---|---|---|
| 4,733,633 | 3/1988 | Yarnall, Sr. et al. | 119/29 |
| 4,745,882 | 5/1988 | Yarnall, Sr. et al. | 119/29 |

*Primary Examiner*—Glen R. Swann, III
*Attorney, Agent, or Firm*—John Selko

[57] ABSTRACT

An animal confinement arrangement has a home base that transmits different signals to two different wires. An animal collar detects a first signal from one wire and, depending upon the strength of the signal detected, activates deterrent and alarm devices, or disconnects the deterrent devices. The collar also reactivates the deterrent devices upon receipt of a second signal from the other wire.

12 Claims, 2 Drawing Sheets

CONFINEMENT ARRANGEMENT FOR ANIMALS

FIELD OF THE INVENTION

This invention relates to an electronic confinement arrangement for animals, and more particularly to a wire fence confinement arrangement which will cause a deterrent signal to be given to an animal, as it approaches the boundary, and also to transmit an alarm signal to the owner, if the animal ignores the deterrent, and leaves the confinement area.

BACKGROUND OF THE INVENTION

One system for accomplishing the confinement of an animal is disclosed in U.S. Pat. No. 4,733,633 to Yarnall et al. A problem with prior art systems is that, if an animal escapes from confinement, and later tries to re-enter, it is subject to the determent effect again, thereby discouraging such return. On the other hand, if the deterrent system is shut off, when the animal first escapes, there is no automatic means for activating the system, after the animal returns to the confinement area.

The foregoing illustrates the limitations known to exist in present confinement systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a confinement arrangement including a home base transmitting means for transmitting a modulated and unmodulated signal. A first wire defines a confinement area and receives and emits the unmodulated signal. A second wire within the confinement area and adjacent to the home base receives and emits the modulated signal. A receiver attached to an animal detects a first low strength level of unmodulated signal from the first wire, and activates deterrent devices on the collar. If the animal continues toward the first wire, the receiver also detects a second higher strength level of unmodulated signal from the first wire, and activates an alarm signal to the home base and disconnects the deterrent circuits. If the animal approaches the second wire, the receiver detects a modulated signal and reactivates the deterrent circuits, thereby reconfining the animal. The foregoing and other aspects will become apparent from the following detailed description of the invention when considered in conjunction with the drawing figures.

DESCRIPTION OF PREFERRED EMBODIMENT AND BEST MODE

Figure 1:
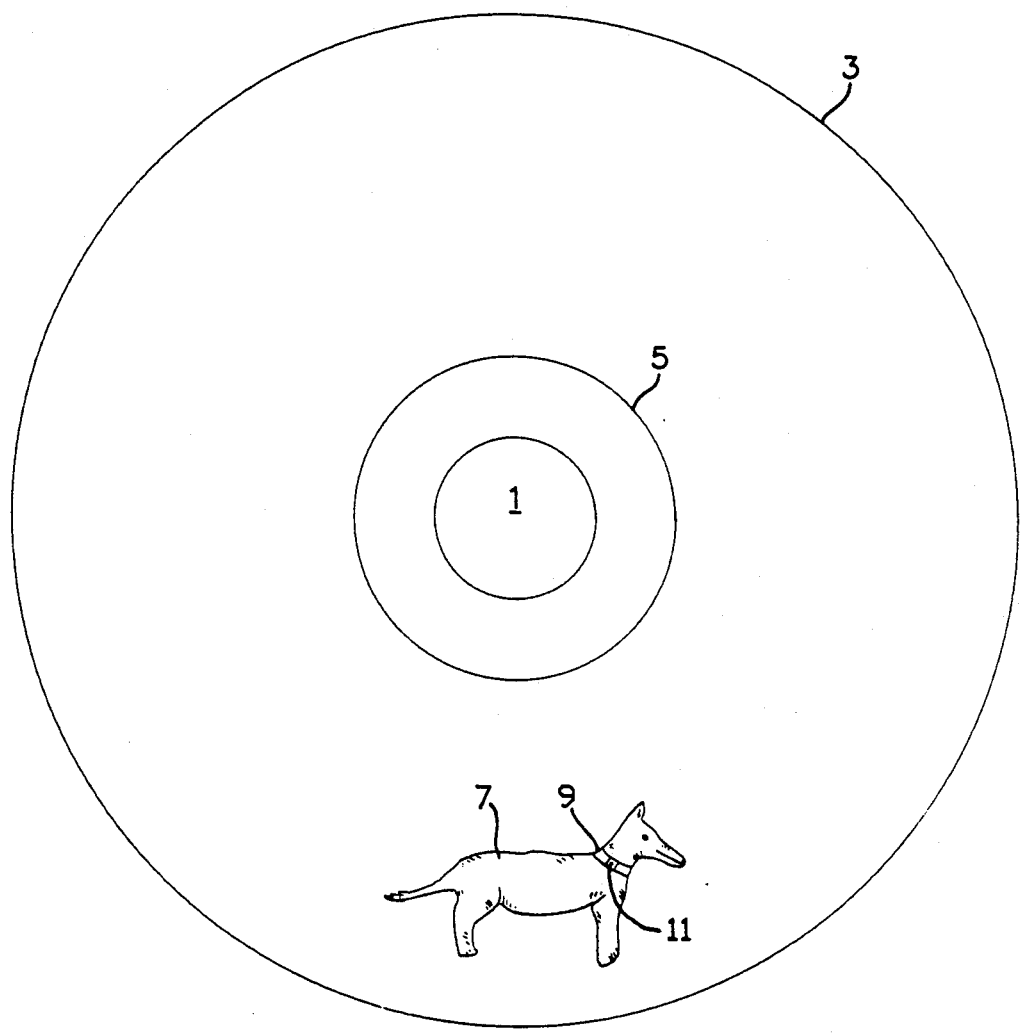
FIG. 1 is a schematic illustration of an exemplary confinement system.

Referring to FIG. 1, there is shown a home base 1, in which is located means for transmitting a first unmodulated signal (A), and a second modulated signal (B). A first signal-emitting wire 3 responsive to first signal (A) is disposed around a confinement area. Wire 3 can be above ground or buried.

A second signal-emitting wire 5, responsive to second signal (B) is disposed within the confinement area, around home base 1. Wire 5 can circle home base 1 or be positioned adjacent to home base 1. Wire 5 can be above ground or buried.

An animal 7 to be kept within the confinement area wears a collar 9 that carries a receiver 11, responsive to first and second signals (A) and (B). First signal (A) is broadcast to wire 3, and is emitted therefrom. The strength of the emitted signal varies with the distance from wire 3, as is well know. As the animal 7 approaches wire 3, the strength of the signal continuously increases, and as the animal departs from wire 3 the strength of the signal decreases. Receiver 11 has a deterrent circuit responsive to a first level of strength of signal (A), preferably between 0.001 and 0.005 watts. Once the first level of strength of signal (A) is detected, the deterrent circuit produces a deterrent, including electrical shock and audio, which both act upon the animal to, it is hoped, drive the animal back toward the center of the confinement area.

If the animal ignores the deterrent and continues to wire 3, the receiver activates its alarm and disconnect circuit. The alarm and disconnect circuit is responsive to a second level of strength of emitted signal (A), preferably 0.01 to 0.05 watts. After the second strength level of signal (A) is detected, the disconnect and alarm circuit disconnects the deterrent circuit, so the animal no longer receives the deterrent, and it may wander outside the confinement area. The term "disconnect" herein refers to an electrical deactivation. Simultaneously with the disconnect, the collar alarm broadcasts an alarm activation signal back to the home base 1, warning the owner that the animal has ignored the deterrent and is escaping.

After the animal escapes, it may desire to return to the home base 1 or to the confinement area, due to habit or due to action of the owner. Collar 9 carries a reconnect circuit responsive to second emitted signal (B). Once the animal approaches wire 5, the reconnect circuit reactivates the disconnected deterrent circuit, and the animal is reconfined.

Figure 2:
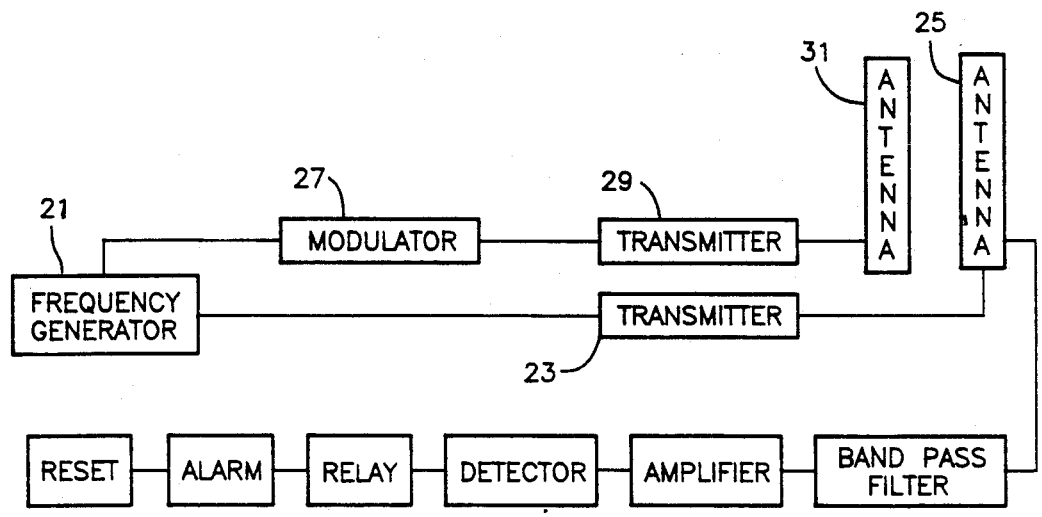
FIG. 2 is an exemplary circuit of a home base transmitter and alarm circuit.

Referring to FIG. 2, and exemplary circuit for home base 1 is shown. The home base circuit is powered by DC electricity. Home base transmitting means includes frequency generator 21 which generates an oscillating signal of predetermined frequency, preferably 30 KHz. A portion of the output of generator 21, signal (A), is broadcast by first transmitter 23 to antenna 25, which is first wire 3. Wire 3 then emits the signal (A) which is received and processed by the receiver in collar 9, as hereinafter described. A portion of the output of generator is directed to modulator 27, which shapes the curve of signal (B), preferably to a square shape, as is well known. This signal (B) is transmitted by second transmitter 29 to antenna 31, also referred to herein as wire 5. Wire 5 then emits the signal (B) which is received and processed by the receiver in collar 9, as hereinafter described. First and second transmitters, 23 and 29, each have means for increasing or decreasing the signal strength, so as to increase the size of the field of transmitted and emitted signals, as is well known.

Figure 3:
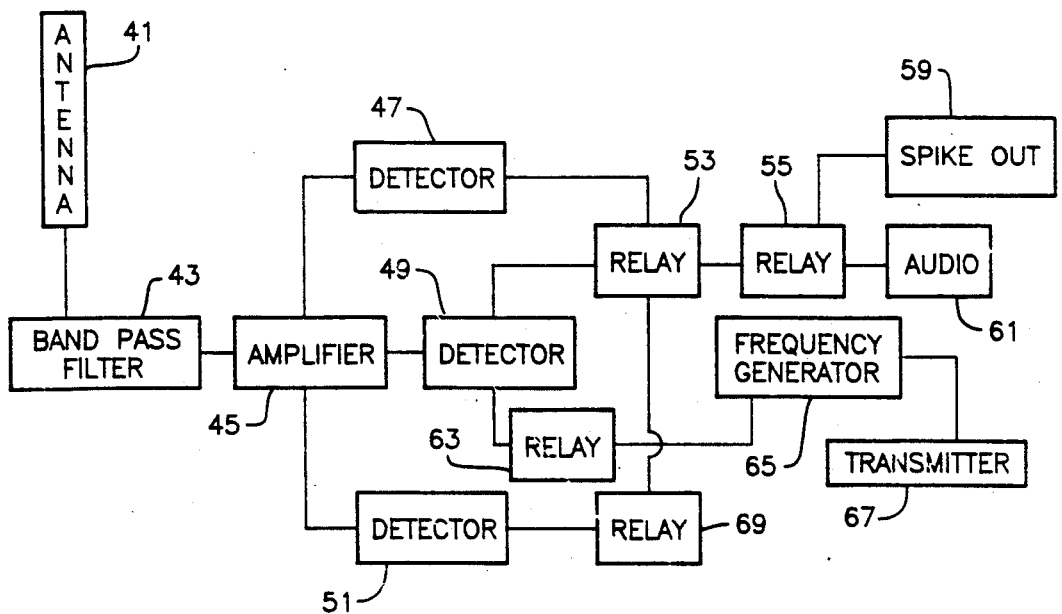
FIG. 3 is an exemplary circuit for a receiver with a deterrent circuit, an alarm circuit and a deterrent control circuit.

Referring to FIG. 3, an exemplary circuit for dog collar 9 is shown. As the animal 7 nears wire 3, the first strength level signal of unmodulated signal (A) is detected by antenna 41 in collar 9. Signal (A) passes through a band pass filter 43, that allows only the predesignated frequency of 30 KHz to pass. Amplifier 45 amplifies signal (A) up to 100 times, so as to energize the remainder of the circuit. The output of amplifier 45 is divided evenly among detectors 47, 49, and 51. Detector 47 is activated only by unmodulated signal (A) of a signal strength of between 0.001 and 0.005 watts. This signal level is detected when the animal is still some distance from wire 3. Detectors 49 and 51 are not activated by the first strength level of signal (A). The output of detector 47 is coupled to first relay 53, which is, in turn, coupled to second relay 55. Relay 55 activates an electrical spike circuit 59 and an audio signal circuit 61, to produce an electrical shock and a sound unpleasant to the animal, as is well know. Circuits to produce the electrical shock and audio are well known in the art, such as in U.S. Pat. No. 4,733,633 referred to hereinabove, and incorporated herein.

If animal 7 continues toward wire 3, second strength level of signal (A) is detected by detector 49. Detector 49 is activated only by unmodulated signal (A) of a signal strength of between 0.01 and 0.05 watts. The output of detector 49 is coupled to third relay 63, which in turn activates frequency generator 65 to broadcast an alarm via transmitter 67, back to home base 1. Frequency generator 65 may be any type of generator capable of generating an oscillating signal at a predetermined frequency, preferably 50 KHz. Detector 49 is also coupled to first relay 53, so that output of detector 49 activates first relay 53, which then activates second relay 55, to deactivate the electrical and audio circuits, 59 and 61 respectively.

After animal 7 returns to the proximity of second emitting wire 5, detector 51 detects the presence of modulated signal (B). Output of detector 51 acts upon fourth relay 69 to activate first relay 53, which activates the second relay 55, to reactivate the deterrent circuits of electrical shock and audio.

While we prefer signals (A) and (B) to be 30 KHz, other radio frequencies could be used. Likewise, the alarm signal frequency of 50 KHZ could be another frequency. Also, while we have disclosed only a single frequency for signals (A) and (B) a plurality of individual frequencies could be transmitted and received, one frequency for a different animal, to make the system workable for a plurality of animals. Finally, while the detectors are activated by first and second strength levels of 0.001/0.005 and 0.01/0.05 watts, other strength levels could be used.

We claim:

1. An animal confinement arrangement comprising:
a) a home base transmitting means for transmitting a first, unmodulated, signal (A), and a second, modulated, signal (B);
b) a first signal-emitting wire responsive to said first, unmodulated signal, said first signal-emitting wire disposed around a confinement area;
c) a second signal-emitting wire responsive to said second, modulated, signal, said second signal-emitting wire disposed adjacent said home base, within the confinement area defined by said first signal-emitting wire;
d) a receiver capable of being attached to an animal and responsive to said first and said second signals, said receiver including:
  (i) a deterrent circuit responsive to a first strength level of said first, unmodulated, signal emitted from said first signal-emitting wire, for producing as an output a deterrent signal which is applied to the animal;
  (ii) a disconnect and alarm circuit responsive to a second strength level of said first, unmodulated, signal emitted from said first signal-emitting wire, said second strength level being higher that said first strength level, said circuit producing as an output a signal to disconnect said deterrent circuit and to produce and broadcast to said first signal-emitting wire an alarm activation signal; and
  (iii) a reconnect circuit responsive to said second, modulated, signal for producing as an output a signal to reconnect said disconnected deterrent circuit; and
e) an alarm circuit responsive to said alarm activation signal.

2. The confinement arrangeement of claim 1 wherein said receiver deterrent circuit produces an electrical shock as an output deterrent signal.

3. The confinement arrangement of claim 1 wherein said receiver deterrent circuit produces as an output deterrent signal an audio signal at a predetermined frequency which is unpleasant to the animal.

4. The confinement arrangement of claim 1 wherein said receiver deterrent circuit produces as an output deterrent signal both an electrical shock and an audio signal at a predetermined frequency which is unpleasant to at least one animal.

5. The confinement arrangement of claim 1 in which said transmitting means comprises:
a) oscillator means for generating an oscillating signal of predetermined frequency, and for outputting said signal as a first and second oscillator output;
b) first transmitter means coupled to said first oscillator output for transmitting said first oscillator output to said first signal-emitting wire;
c) modulator means coupled to said second oscillator output for modulating said second oscillator output; and
d) second transmitter means coupled to said modulator for transmitting said modulator output to said second signal-emitting wire.

6. The confinement arrangement of claim 1 in which said alarm circuit comprises:
a) an antenna for receiving said alarm activation signal broadcast by said first signal-emitting wire;
b) filtering means responsive to the received signal for eliminating frequencies below a first predetermined frequency and above a second predetermined frequency;
c) amplifying means coupled to the output of said filtering means for increasing the signal level of the filtered received signal; and
d) detecting means coupled to the output of said amplifying means for detecting the presence of said alarm signal and generating as an output a control signal when said alarm signal is present.

7. The confinement arrangement of claim 6 in which said deterrent, disconnect and alarm circuits comprise:
a) an antenna for receiving said first, unmodulated, signal emitted by said first signal-emitting wire;
b) filtering means responsive to the received signal for eliminating frequencies below a first predetermined frequency and above a second predetermined frequency;

c) amplifying means coupled to the output of said filtering means for increasing the signal level of the filtered received signal;
d) first detecting means coupled to the output of said amplifying means responsive to said first strength level of said first unmodulated signal emitted from said first signal-emitting wire, for generating as an output a first detector signal;
e) second detecting means coupled to the output of said amplifying means responsive to said second strength level of said first, unmodulated, signal emitted from said first signal-emitting wire, for generating as an output a second detector signal;
f) first relay means coupled to said first and second detector signal for producing as an output a first relay control signal;
g) second relay means coupled to said first relay control signal for activating and deactivating a deterrent device;
h) third relay means coupled to said second detector signal for producing as an output a third relay signal;
i) oscillator means coupled to said output of said third relay for generating as an output an oscillating signal of predetermined frequency;
j) transmitter means coupled to said oscillator output for transmitting said oscillator output to said alarm circuit.

8. The invention of claim 7 in which said reconnect circuit comprises:
a) a third detecting means coupled to the output of said amplifying means responsive to said second, modulated, signal emitted from said second signal-emitting wire, for generating as an output a second detector signal; and
b) fourth relay means coupled to said third detector signal for activating and deactivating said first relay means.

9. The invention of claim 8 in which said predetermined frequency of said first, unmodulated, signal A and said second, modulated, signal B is 30 KHz.

10. The invention of claim 9 in which the first strength level is between 0.001 and 0.005 Watts.

11. The invention of claim 10 in which the second strength level is between 0.01 and 0.05 Watts.

12. The invention of claim 11 in which the alarm activation oscillating signal frequency is 50 KHz.

* * * * *